US011393098B2

(12) United States Patent
Schmaler et al.

(10) Patent No.: US 11,393,098 B2
(45) Date of Patent: Jul. 19, 2022

(54) CONSTRAINED OBJECT CORRECTION FOR A SEGMENTED IMAGE

(71) Applicant: Brainlab AG, Munich (DE)

(72) Inventors: Jens Schmaler, Mering (DE); Andreas Giese, Munich (DE); Andreas Blumhofer, Neubiberg (DE)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 16/959,254

(22) PCT Filed: Feb. 27, 2018

(86) PCT No.: PCT/EP2018/054794
§ 371 (c)(1),
(2) Date: Jun. 30, 2020

(87) PCT Pub. No.: WO2019/166074
PCT Pub. Date: Sep. 6, 2019

(65) Prior Publication Data
US 2020/0334821 A1 Oct. 22, 2020

(51) Int. Cl.
*G06T 7/70* (2017.01)
*G06T 7/11* (2017.01)
(Continued)

(52) U.S. Cl.
CPC .............. *G06T 7/11* (2017.01); *G06T 7/0012* (2013.01); *G06T 7/20* (2013.01); *G06T 7/70* (2017.01);
(Continued)

(58) Field of Classification Search
CPC . G06T 7/0012; G06T 7/11; G06T 7/20; G06T 7/174; G06T 7/70;
(Continued)

(56) References Cited

U.S. PATENT DOCUMENTS

2009/0295800 A1 12/2009 Vetter et al.
2011/0013818 A1 1/2011 Eriksson
(Continued)

FOREIGN PATENT DOCUMENTS

WO WO2009093146 A1 7/2009
WO 2019166074 A1 9/2019

OTHER PUBLICATIONS

International Search Report and Written Opinion for Application No. PCT/EP2018/054794 dated Oct. 26, 2018.

*Primary Examiner* — Syed Haider
(74) *Attorney, Agent, or Firm* — Middleton Reutlinger

(57) ABSTRACT

Disclosed is a computer-implemented method of segmenting a medical patient image using an atlas and relating the segmentation result to a model of possible geometric changes to the segmentation result (e.g. for correcting the position of the segmentation of anatomical structures) which consider for example anatomical limitations. The thus-related segmentation result may be used as a basis for changing and/or correcting the position, shape and/or orientation of at least parts of the segmentation result, e.g. by user interaction. The invention also relates to an atlas data set comprising information such as values of the variables of the model of possible geometric changes in relation to the positions of anatomical structures in the atlas.

9 Claims, 3 Drawing Sheets

(51) Int. Cl.
*G06T 7/00* (2017.01)
*G06T 7/20* (2017.01)

(52) U.S. Cl.
CPC .............. *G06T 2207/20128* (2013.01); *G06T 2207/30081* (2013.01)

(58) Field of Classification Search
CPC . G06T 2207/10088; G06T 2207/10132; G06T 2207/20128; G06T 2207/10081; G06T 2207/20092; G06T 2207/30081
See application file for complete search history.

(56) References Cited

U.S. PATENT DOCUMENTS

| | | | | |
|---|---|---|---|---|
| 2013/0243287 | A1* | 9/2013 | Thomson | G06T 7/11 382/128 |
| 2016/0171692 | A1* | 6/2016 | Blumhofer | G06T 7/337 382/128 |
| 2016/0328855 | A1* | 11/2016 | Lay | G06K 9/4614 |

* cited by examiner

CONSTRAINED OBJECT CORRECTION FOR A SEGMENTED IMAGE

FIELD OF THE INVENTION

The present invention relates to a computer-implemented method for determining the geometric transformability of a segmentation of a medical patient image, a corresponding computer program, a non-transitory program storage medium storing such a program and a computer for executing the program, as well as a medical system comprising an electronic data storage device and the aforementioned computer.

TECHNICAL BACKGROUND

The result of automatically segmenting a representation of an anatomical structure in an image often is not perfect and modification by a user may be required. Current modification tools normally modify only one object. This is done by simply brushing, by brushing constrained by the edges of the gray value images, by more intelligent brushing (smart brush) or by deforming (smart shaper). Known methods generally modify only one object at a time. Anatomic constraints with respect to other objects are thereby not considered. For example, if one modifies the prostate, the bladder and the rectum must also be moved accordingly. Such a consistent modification of multiple objects is not possible with the existing tools.

The present invention has the object of providing a method which supports simultaneous modification of several structures, but respects anatomical constraints The present invention can be used for electronic data processing related image-based pre-planning which may be done e.g. using the Elements modules, a product of Brainlab AG, e.g. in connection with a system for image-guided radiotherapy such as VERO® and ExacTrac®, both also products of Brainlab AG.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

In the following, a short description of the specific features of the present invention is given which shall not be understood to limit the invention only to the features or a combination of the features described in this section.

The disclosed method encompasses segmenting a medical patient image using an atlas and relating the segmentation result to a model of possible geometric changes to the segmentation result (e.g. for correcting the position of the segmentation of anatomical structures) which consider for example anatomical limitations. The thus-related segmentation result may be used as a basis for changing and/or correcting the position, shape and/or orientation of at least parts of the segmentation result, e.g. by user interaction. The invention also relates to an atlas data set comprising information such as values of the variables of the model of possible geometric changes in relation to the positions of anatomical structures in the atlas.

GENERAL DESCRIPTION OF THE INVENTION

In this section, a description of the general features of the present invention is given for example by referring to possible embodiments of the invention.

In general, the invention reaches the aforementioned object by providing, in a first aspect, a computer-implemented medical method for determining the geometric transformability of a segmentation of a medical patient image. The method comprises executing, on at least one processor of at least one computer (for example at least one computer being part of the navigation system or planning system), the following exemplary steps which are executed by the at least one processor.

In a (for example first) exemplary step, patient image data is acquired which describes a patient image of an anatomical body part of a patient. The patient image data has for example been generated beforehand (i.e. before execution of the method according to the first aspect starts) or as a part of the disclosed method according to the first aspect. The patient image data has been or is generated by applying a medical imaging modality to the anatomical body part. For example, the patient image data is two-dimensional medical image data such as a radiography or three-dimensional image data such as a magnetic resonance tomography or a computed x-ray tomography or a sonography. The anatomical body part may essentially be any part of a patient body and may include at least one of bony (including cartilage) or soft tissue. In examples, the anatomical body part comprises a plurality of (i.e. at least two) anatomical structures which may be physically connected to each other (such as the prostate and the rectum).

In a (for example second) exemplary step, atlas data is acquired which describes an image-based model of the anatomical body part and at least one value of at least one parameter (which in the framework of this disclosure may also be called variable) of a geometric transformability model of the anatomical body part. The at least one value of the at least one parameter may be used as an input quantity to the corresponding parameter used in the geometric transformability model. The at least one parameter may represent a physical variable for example as a numeric variable (e.g. of integer or real type, i.e. a numeric value of the physical variable) but may alternatively or additionally be of a different data type such as a logic variable (e.g. of Boole type), e.g. for executing a logical operation when conducting a computation on the geometric transformability model.

In a (for example third) exemplary step, transformability model data is acquired which describes the geometric transformability model of the anatomical body part (for example, of a digital image representation of the anatomical body part). The geometric transformability model describes a geometric transformability of the anatomical body part and/or of the image representation of the anatomical body part. Specifically, it describes the geometric transformability of each of the anatomical structures which are part of the anatomical body part. The term of geometric transformability encompasses for example the degrees of freedom (for example, at least one of possible translations or rotations) of movement of each anatomical structure and for example additionally or alternatively at least one of an elasticity or compressibility of each anatomical structure (defined e.g. by a spring model or finite element model). The term of geometric transformation thus encompasses movement (i.e. at least one of translation and rotation, for example rigid translation or rotation) of each anatomical structure and for example additionally or alternatively at least one of an elastic deformation or compression of the anatomical body part or at least an anatomical structure included in the anatomical body part). Alternatively or additionally, the geometric transformability encompasses a definition of whether the anatomical structure can be penetrated by another anatomical structure (for example, if the anatomical structure comprises bony tissue, the geometric transformability model may define that the bony tissue cannot be penetrated by soft tissue, i.e. that a soft tissue anatomical structure cannot be at the same position as the bony tissue anatomical structure). The transformability model data may be part of the atlas data (e.g. stored in the same data set) or may form a separate data set which for example is linked (e.g. concerning positional information) to the image-based model of the anatomical body part described by the atlas data.

For example, the geometric transformability model describes a movement interaction (for example, a possible movement interaction, e.g. simultaneous movement, an unchanged motion state, a restricted movement, a sliding movement) between the relative positions of at least substantially disjunct parts of the image-based model of the anatomical body part which for example resemble the anatomical structures which are part of the anatomical body part.

For example, the geometric transformability model describes a movability (for example at least one of translational or rotational degrees of freedom, of the anatomical body part i.e. the possibility of moving of the anatomical body part, specifically individually for each of the anatomical structures) and alternatively or additionally an elastic or inelastic deformation model of the image-based model of the anatomical body part, for example a distance-dependent deformation function of the image-based model of the anatomical body part (e.g. of the anatomical structures defined in the image-based model).

For example, the geometric transformability model is defined on a grid, for example numeric grid, which is for example linked to at least substantially disjunct parts of the anatomical body part. The grid defines nodes which for example define positions at which results of possible geometric transformation are calculated on the basis of e.g. computing the physics of the geometric transformability model.

For example, the geometric transformability model comprises a shape model describing allowed shapes and movement directions of at least substantially disjunct parts of the image-based model of the anatomical body part.

For example, boundary conditions of the geometric transformability model are defined within and/or between at least substantially disjunct parts of the anatomical body part. For example, the geometric transformability model contains boundary conditions defining for example anatomical realities such as a physical connection between anatomical structures which means that if geometry (including for example the position) of one of the structures is transformed, the geometry (including for example the position) of another anatomical structure connected to that anatomical structure has to be correspondingly transformed. Alternatively or additionally, the boundary conditions may define that anatomical structures may not intersect and/or penetrate one another (i.e. may not have the same position) as a result of transforming the geometry of at least one of the anatomical structures, or that certain anatomical structure may only slide along another or always have to be fixed relative to a global coordinate system. In one exemplary implementation, a user may violate the boundary conditions set by the method, e.g. in order to manually correct the segmentation result. A possible case would be that the segmentation result defines an artery to lie outside of the spine even though it should be located inside the spine. Even though the spine would be defined as bony tissue which cannot be penetrated by soft tissue such as the artery, the user would be allowed to for example drag and drop the segmented image representation of the artery into the segmented image representation of the spine. For example, the boundary condition prohibiting such an action and automatically set by the method can be overridden if it has been deactivated, e.g. by user input.

In a (for example fourth) exemplary step, segmented image data is determined, based on the patient image data and the atlas data and the transformability model data, which describes a segmentation of the patient image and a geometric relation between the geometric transformability model and the segmentation. For example, the segmented image data is determined by determining a positional transformation between the patient image of the anatomical body part and the image-based model of the anatomical body part. For example, the positional transformation (which may take the form of a linear transform which can be defined by a mapping matrix) is determined by applying an image matching algorithm, for example an elastic or rigid image fusion algorithm, to the patient image data and the atlas data. The positional transformation thus represents an image registration between the patient image described by the patient image data and the image-based model described by the atlas. The geometric relation between the geometric transformability model may be established by pre-defining a relationship between anatomical structures described the atlas data and corresponding portions of the geometric transformability model. For example, a geometric (e.g. positional) relation between the geometric transformability model and the anatomical structures segmented in the patient image is established based on (e.g. via) the positional transformation between the patient image and the image-based model of the atlas data.

In a (for example fifth) exemplary step, assigned transformability model data is determined, based on the segmented image data and the atlas data, which describes an assignment of the at least one value of the at least one parameter to the geometric relation between the geometric transformability model and the segmentation. For example, the assignment of the at least one value of the at least one parameter to the geometric relation between the geometric transformability model and the segmentation is determined by inputting the at least one value of the at least one parameter to the transformability model. The assignment therefore constitutes an application of the geometric transformability model to the segmented patient image. For example, the assignment is implemented by relating the positions of the nodes of the geometric transformability model to the positions of anatomical structures represented by the segmented patient image (such as a meshing, e.g. a grid generation leading to a grid representation of the anatomical body part, and mapping of at least one physical quantity and/or mechanical boundary conditions to at least one predetermined part of the mesh and/or grid).

In a second aspect, the invention is directed to a computer-implemented medical data processing method of adapting a segmentation of a medical patient image, the method comprising the following steps:
  a) executing the method according to the first aspect;
  b) determining, based on the segmented image data and the assigned transformability model data, changed (e.g. manually or automatically changed) segmented image data describing a changed segmentation of the patient image.

This allows a user to for example manually change and/or correct the result of the segmentation of the patient image while automatically respecting the boundary conditions of the geometric transformability model. For example, the user may use a pointing tool such as a mouse cursor or a touch screen for selecting a part of the assigned geometric transformability model (e.g. a node of the above-described grid) for changing its position as desired. Alternatively or additionally, the change and/or correction of the segmented patient image may be determined automatically. The distorted grid (i.e. the changed segmentation and the resulting change of the assigned geometric transformability model) can also be used to distort the registration (the atlas-patient mapping, i.e. the transformation between the patient image described by the patient image data and the image-based model described by the atlas data), which was the basis for the segmentation: $Reg_{new}=Distortion*Reg_{old}$ (where $Reg_{new}$ is the new atlas-patient mapping after correcting the segmentation, Distortion is the change to the segmentation and/or the geometric transformability model, and $Reg_{old}$ is the atlas-patient mapping before correcting the segmentation).

In a third aspect, the invention is directed to a computer program which, when running on at least one processor (for example, a processor) of at least one computer (for example, a computer) or when loaded into at least one memory (for example, a memory) of at least one computer (for example, a computer), causes the at least one computer to perform the above-described method according to the first or second aspect. The invention may alternatively or additionally relate to a (physical, for example electrical, for example technically generated) signal wave, for example a digital signal wave, carrying information which represents the program, for example the aforementioned program, which for example comprises code means which are adapted to perform any or all of the steps of the method according to the first or second aspect. A computer program stored on a disc is a data file, and when the file is read out and transmitted it becomes a data stream for example in the form of a (physical, for example electrical, for example technically generated) signal. The signal can be implemented as the signal wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the third aspect therefore may alternatively or additionally relate to a data stream representative of the aforementioned program.

In a fourth aspect, the invention is directed to a non-transitory computer-readable program storage medium on which the program according to the third aspect is stored.

In a fifth aspect, the invention is directed to at least one computer (for example, a computer), comprising at least one processor (for example, a processor) and at least one memory (for example, a memory), wherein the program according to the third aspect is running on the processor or is loaded into the memory, or wherein the at least one computer comprises the computer-readable program storage medium according to the fourth aspect.

In a sixth aspect, the invention is directed to a system for planning a medical procedure, comprising:
a) the at least one computer according to the fifth aspect;
b) at least one electronic data storage device storing at least the patient image data, the atlas data and the transformability model data; and
c) a display device for displaying at least one of the patient image data, the segmented image data or, as far as the program run by the computer or loaded into the memory of the computer causes the computer to perform the method according to the second aspect, the changed segmented image data;
d) wherein the at least one computer is operably coupled
to the at least one electronic data storage device for acquiring, from the at least one data storage device, at least the patient image data, the atlas data and the transformability model data, and
to the display device for issuing, to the display device, a command for displaying at least one of the patient image data, the segmented image data or, as far as the program run by the computer or loaded into the memory of the computer causes the computer to perform the method of claim 10, the changed segmented image data.

In a seventh aspect, the invention is directed to a data set (for example, an electronic and/or digital data set) comprising atlas data, the atlas data describing an image-based model of the anatomical body part, and the data set comprising at least one of
the transformability model data which describes a geometric transformability model of an anatomical body part; or
information about at least one value of the at least one parameter of the geometric transformability model for geometrically transforming the anatomical body part (for example, a digital image representation of the anatomical body part).

In an example of the data set according to the seventh aspect, the geometric transformability model describes a movability, for example at least one of translational or rotational degrees of freedom, of the anatomical body part or an elastic or inelastic deformation model of the image-based model of the anatomical body part, for example a distance-dependent deformation function of the image-based model of the anatomical body part.

In an eighth aspect, the invention is directed to a non-transitory, for example digital or electronic, data storage medium on which the data set according to the seventh aspect is stored, and/or a digital data file comprising the data set according to the seventh aspect, and/or at least one of a data sequence or signal wave or data stream, for example digital or electronic signal wave or digital or electronic data stream, representing the data set according to the seventh aspect.

In a ninth aspect, the present invention is directed to the use of the system according to the sixth aspect for planning a medical procedure. The use comprises for example at least causing the computer of the system to execute the method according to the first or second aspect or the program according to the third aspect.

For example, the invention does not involve or in particular comprise or encompass an invasive step which would represent a substantial physical interference with the body requiring professional medical expertise to be carried out and entailing a substantial health risk even when carried out with the required professional care and expertise.

Definitions

In this section, definitions for specific terminology used in this disclosure are offered which also form part of the present disclosure.

Computer Implemented Method

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

Acquiring Data

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" a described herein for example comprises or consists of issuing a command to perform the determination described herein. For example, the step comprises or consists of issuing a command to cause computer, for example a remote computer, for example a remote server, for example in the cloud, to perform the determination. Alternatively or additionally, a step of "determining" as described herein for example comprises or consists of receiving the data resulting from the determination described herein. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Image Registration

Image registration is the process of transforming different sets of data into one coordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

Atlas/Atlas Segmentation

Preferably, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The atlas data comprises image information (for example, positional image information) which can be matched (for example by applying an elastic or rigid image fusion algorithm) for example to image information (for example, positional image information) contained in medical image data so as to for example compare the atlas data to the medical image data in order to determine the position of anatomical structures in the medical image data which correspond to anatomical structures defined by the atlas data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

For example, the atlas data includes information of the anatomical body part. This information is for example at least one of patient-specific, non-patient-specific, indication-specific or non-indication-specific. The atlas data therefore describes for example at least one of a patient-specific, non-patient-specific, indication-specific or non-indication-specific atlas. For example, the atlas data includes movement information indicating a degree of freedom of movement of the anatomical body part with respect to a given reference (e.g. another anatomical body part). For example, the atlas is a multimodal atlas which defines atlas information for a plurality of (i.e. at least two) imaging modalities and contains a mapping between the atlas information in different imaging modalities (for example, a mapping between all of the modalities) so that the atlas can be used for transforming medical image information from its image depiction in a first imaging modality into its image depiction in a second imaging modality which is different from the first imaging modality or to compare (for example, match or register) images of different imaging modality with one another.

Imaging Methods

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT), as mentioned by Wikipedia. The image data thus generated is also termed "medical imaging data". Analytical devices for example are used to generate the image data in apparatus-based imaging methods. The imaging methods are for example used for medical diagnostics, to analyse the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method. In addition to these tumours, referred to as "enhancing" tumours, it is thought that approximately 10% of brain tumours are not discernible on a scan and are for example not visible to a user looking at the images generated by the imaging method.

Mapping

Mapping describes a transformation (for example, linear transformation) of an element (for example, a pixel or voxel), for example the position of an element, of a first data set in a first coordinate system to an element (for example, a pixel or voxel), for example the position of an element, of a second data set in a second coordinate system (which may have a basis which is different from the basis of the first coordinate system). In one embodiment, the mapping is determined by comparing (for example, matching) the color values (for example grey values) of the respective elements by means of an elastic or rigid fusion algorithm. The mapping is embodied for example by a transformation matrix (such as a matrix defining an affine transformation).

Elastic Fusion, Image Fusion/Morphing, Rigid

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application, the term "image morphing" is also used as an alternative to the term "elastic image fusion", but with the same meaning.

Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are for example vectors of a deformation field. These vectors are determined by the optimisation algorithm in such a way as to result in an optimum degree of similarity. Thus, the optimum degree of similarity represents a condition, for example a constraint, for the optimisation algorithm. The bases of the vectors lie for example at voxel positions of one of the first and second images which is to be transformed, and the tips of the vectors lie at the corresponding voxel positions in the transformed image. A plurality of these vectors is preferably provided, for instance more than twenty or a hundred or a thousand or ten thousand, etc. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting and for example that the transformed (deformed) image does not comprise faults and/or ruptures. The constraints include for example the constraint that if a regular grid is transformed simultaneously with the image and in a corresponding manner, the grid is not allowed to interfold at any of its locations. The optimising problem is for example solved iteratively, for example by means of an optimisation algorithm which is for example a first-order optimisation algorithm, such as a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there is a plurality of local optima, global algorithms such as simulated annealing or generic algorithms can be used. In the case of linear optimisation problems, the simplex method can for instance be used.

In the steps of the optimisation algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

The determined elastic fusion transformation can for example be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can for example be determined on the basis of a determined correlation between the first and second datasets.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
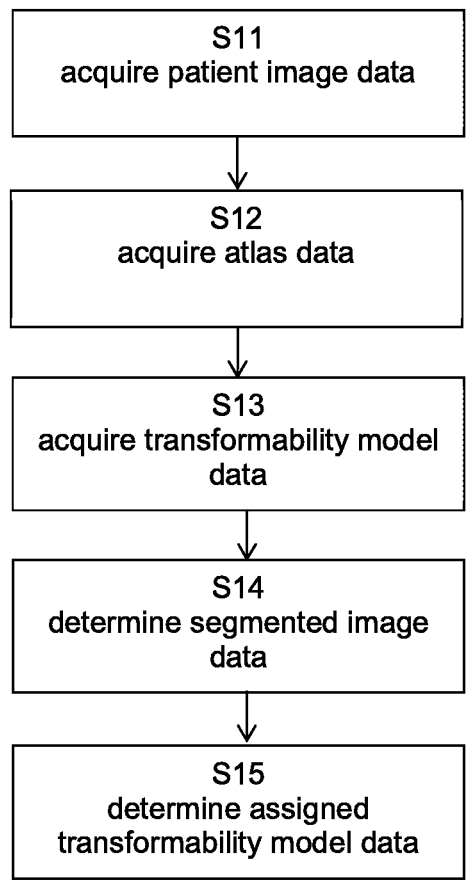
FIG. 1 illustrates a flow diagram showing the basic steps of the method according to the first aspect.

FIG. 1 illustrates the basic steps of the method according to the first aspect, in which step S11 encompasses acquiring the patient image data, step S12 encompasses acquiring the atlas data, step S13 encompasses acquiring the transformability model data, step S14 encompasses determining the segmented image data and subsequent step S15 encompasses determining the assigned transformability model data.

Figure 2:
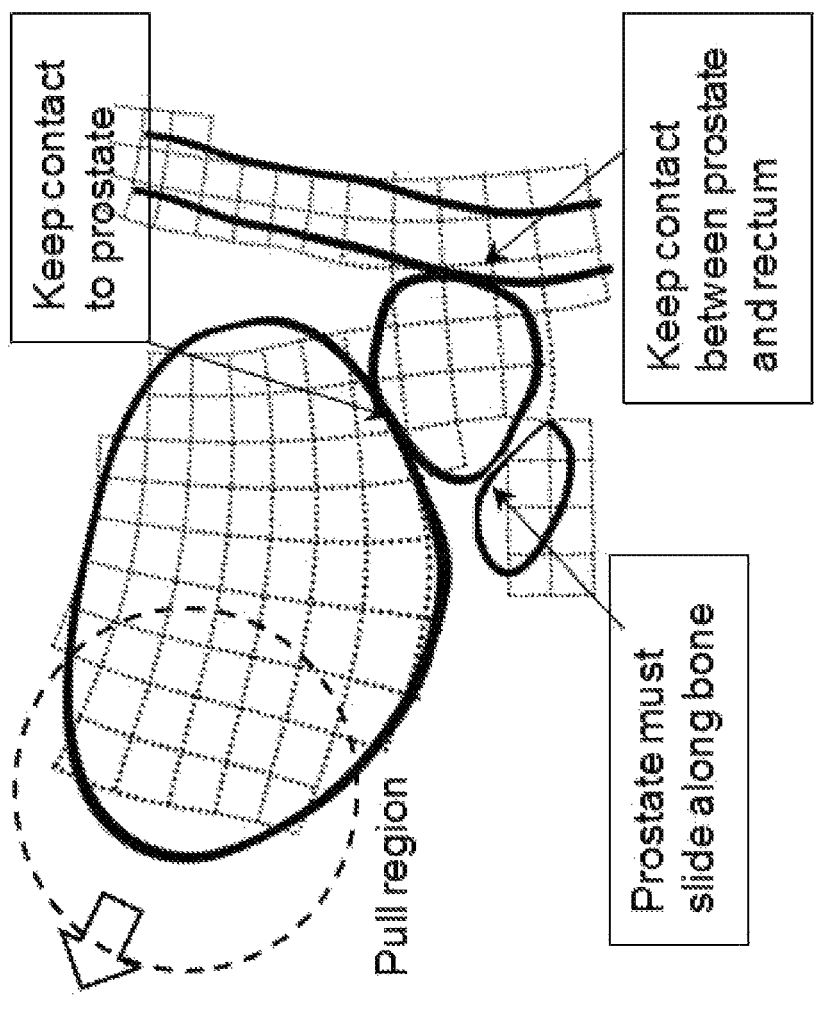
FIG. 2 illustrates deformation of an image representation of anatomical structures in the segmented patient image and boundary conditions therefor.
Figure 2:
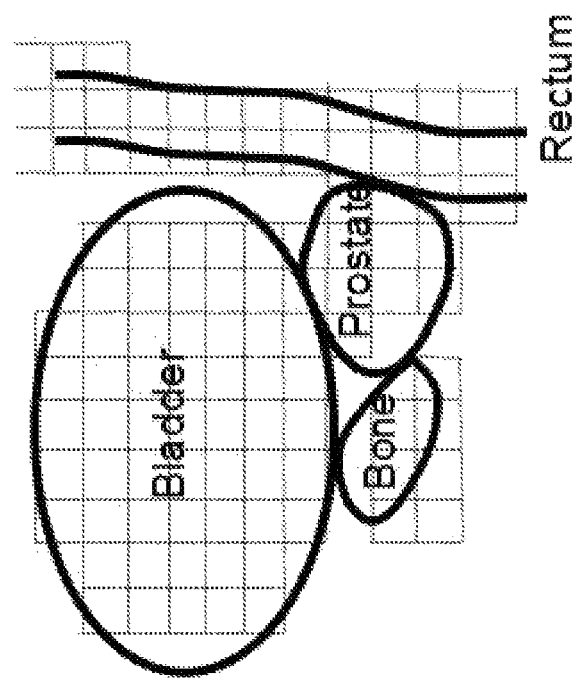

FIG. 2 illustrates deformation of a digital image representation (i.e. a depiction) of anatomical structures in the segmented patient image and boundary conditions therefor. A composite object may be defined to move multiple objects (e.g. prostate, bladder and rectum), which is moved as a whole, i.e. a deformation field is created which overlays the union of the objects. When the grid is smoothly deformed, the objects which are connected to the grid (i.e. the anatomical structures which have been assigned to the geometric transformability model) are deformed simultaneously.

However, not all objects are anatomically connected to each other. If an object is moved, adjacent structures may either
  be simultaneously moved, or
  stay unchanged, or
  restrict the movement of the object, or
  move only when they are touched, or
  slide along other objects, or
  move in a way which is predetermined by anatomical restrictions like sinew or joint.

One possible solution may be a bio-mechanical model which is constrained by the anatomical variability of the human being. In such a model, not only normal anatomically correct movements are possible, but also movements which correspond to anatomical variabilities, e.g. the heart cannot move in the thorax of an individual, but it can be at different positions for different individuals. Therefore, the method according to the first aspect may allow moving the heart inside the thorax. However, it may not allow to separate the bladder from the prostate, since this is not possible for any individual.

A model may be generated by statistically evaluating a set of patient images. From the statistic variability, the motion/movability parameters and the model may be received. Evaluation of different scans of one patient will lead to finding e.g. an arm in each patient image in a different position. From the resulting variability, a rotation of the arm may be determined. A computer program can do that fully automatically and on that basis calculate a model. That will then be a model. If the same is done for scans from many different patients, one will notice that the model does not only permit rotation of the respective arm but also a change of length of that arm because every human being has a different arm length. Such a model will then have been generated in the same manner as the above-mentioned biomechanical model but will be based on a different set of images.

In a given segmentation of a patient image data set, e.g. a segmented bladder, prostate, rectum and bone are present. These segmentations appear as overlays over the gray value patient image data set so that one can observe, whether there are differences between the segmentation result and the position of image representations of anatomical structures in the patient image or not. If there are differences, the user may want to correct these differences.

The method according to the first aspect includes the following approach for allowing for such a correction:

A model of the human body is defined. This can be done e.g. by defining a deformation grid, which overlays the organs but is disconnected at vertices belonging to not connected organs as shown in FIG. 2.

The grid is connected to the organs. When pulling or pushing the grid (e.g. manual user interaction with a pointer tool such as a mouse or a touch screen for selecting e.g. a node of the grid for changing its position, e.g. by drag-and-drop), the organs also move accordingly. The grid has a certain elasticity (defined e.g. by a spring model or finite element model), so that the whole grid moves when pulling at some region. The coefficients of this elasticity may not be driven by the real elasticity of the tissue, but by a strength given by GUI input, which defines a kind of range of the deformation. Distant structures may be defined to move slower than nearby structures. If one pulls at the top left corner of the bladder, the bladder may be defined to move stronger than the prostate. And when changing the position of the segmentation of the rectum, only the part connected directly to the prostate moves slowly. The other rectum parts move very slowly. The bone is not connected at all and don't move. The structures may be defined to keep their position after movement (e.g. when the user releases the mouse button). The next movement may be defined to start with a new regular grid. The movement action can then be repeated several times.

The grid can be defined in the atlas and can be transferred to the patient.

There are also border conditions, which have to be taken into account, e.g. the prostate is not allowed to move into the bone. Rather, it can only slide along the bone. There are in principle two boundary conditions: 1) collision (no overlap of organs), and 2) sliding with contact (two organs are always in contact, but the contact point(s) can move, e.g. lung, liver and heart, which move simultaneously, but along the ribs).

The distorted grid can also be used to distort the registration (the atlas-patient mapping), which was the basis for the segmentation: $Reg_{new}$=Distortion*$Reg_{old}$. This registration can be used afterwards to transfer other objects from the atlas to the patient. If the newly transferred objects are in the region of bladder, prostate or rectum, their segmentation can be as well automatically corrected.

Figure 3:
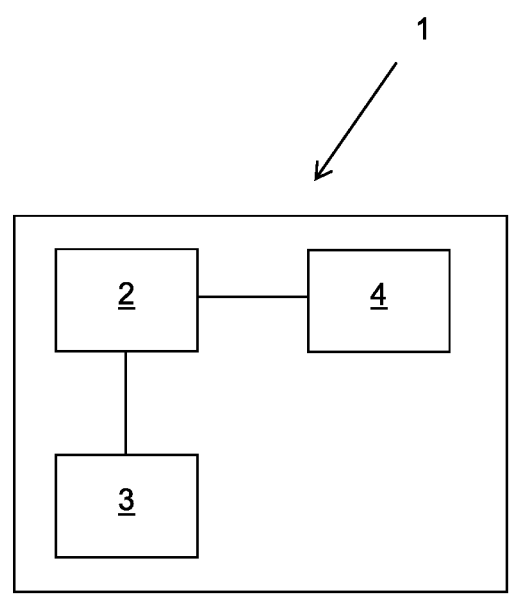
FIG. 3 is a schematic illustration of the system according to the sixth aspect.

FIG. 3 is a schematic illustration of the medical system 1 according to the sixth aspect. The system is in its entirety identified by reference sign 1 and comprises a computer 2, an electronic data storage device (such as a hard disc) 3 for storing at least the patient data and a display device 4 (such as a monitor). The components of the medical system 1 have the functionalities and properties explained above with regard to the sixth aspect of this disclosure.

The invention claimed is:

1. A computer-implemented method for determining geometric transformability of a segmentation of a medical patient image, comprising:
   acquiring patient image data which describes a patient image of an anatomical body part of a patient;
   acquiring atlas data which describes an image-based model of the anatomical body part and at least one value of at least one parameter of a geometric transformability model of the anatomical body part;
   acquiring transformability model data which describes the geometric transformability model of the anatomical body part;
   determining segmented image data, based on the patient image data and the atlas data and the transformability model data, which describes the segmentation of the patient image and a geometric relation between the geometric transformability model and the segmentation; and
   determining assigned transformability model data, based on the segmented image data and the atlas data, which describes an assignment of the at least one value of the at least one parameter to the geometric relation between the geometric transformability model and the segmentation;
   wherein the geometric transformability model of the segmentation of the medical patient image is described by the assigned transformability model data and describes a movability of at least one translational or rotational degree of freedom of the anatomical body part.

2. The method according to claim 1, wherein the geometric transformability model describes a movement interaction between relative positions of disjunct parts of the image-based model of the anatomical body part.

3. The method according to claim 1, wherein the geometric transformability model describes an elastic or inelastic deformation model of the image-based model of the anatomical body part for a distance-dependent deformation function of the image-based model of the anatomical body part.

4. The method according to claim 1, wherein the geometric transformability model is defined on a numeric grid which is linked to disjunct parts of the anatomical body part.

5. The method according to claim 1, wherein the geometric transformability model comprises a shape model describing allowed shapes and movement directions of disjunct parts of the image-based model of the anatomical body part.

6. The method according to claim 1, wherein the assignment of the at least one value of the at least one parameter to the geometric relation between the geometric transformability model and the segmentation is determined by inputting the at least one value of the at least one parameter to the geometric transformability model.

7. The method of claim 1 further comprising
   adapting the segmentation of the medical patient image;
   determining, based on the segmented image data and the assigned transformability model data, changed segmented image data describing a changed segmentation of the patient image.

8. A system for planning a medical procedure, comprising:
- at least one computer having at least one processor;
- wherein the at least one processor is operable to:
  - acquire patient image data which describes a patient image of an anatomical body part of a patient;
  - acquire atlas data which describes an image-based model of the anatomical body part and at least one value of at least one parameter of a geometric transformability model of the anatomical body part;
  - acquire transformability model data which describes the geometric transformability model of the anatomical body part;
  - determine segmented image data, based on the patient image data and the atlas data and the transformability model data, which describes a segmentation of the patient image and a geometric relation between the geometric transformability model and the segmentation; and
  - determine assigned transformability model data, based on the segmented image data and the atlas data, which describes an assignment of the at least one value of the at least one parameter to the geometric relation between the geometric transformability model and the segmentation;
  - wherein the geometric transformability model of the segmentation of the patient image is described by the assigned transformability model data and describes a movability of at least one translational or rotational degree of freedom of the anatomical body part;
- a display device for displaying at least one of the patient image data, the segmented image data or changed segmented image data;
- wherein the at least one computer is operably coupled to at least one electronic data storage device for acquiring, from the at least one electronic data storage device, at least the patient image data, the atlas data and the transformability model data, and to the display device for issuing, to the display device, a command for displaying at least one of the patient image data, the segmented image data or, the changed segmented image data.

9. A non-transitory computer readable medium comprising instructions stored thereon which when executed by at least one processor causes the at least one processor to:
- acquire patient image data which describes a patient image of an anatomical body part of a patient;
- acquire atlas data which describes an image-based model of the anatomical body part and at least one value of at least one parameter of a geometric transformability model of the anatomical body part;
- acquire transformability model data which describes the geometric transformability model of the anatomical body part;
- determine segmented image data, based on the patient image data and the atlas data and the transformability model data, which describes a segmentation of the patient image and a geometric relation between the geometric transformability model and the segmentation; and
- determine assigned transformability model data based on the segmented image data and the atlas data, which describes an assignment of the at least one value of the at least one parameter to the geometric relation between the geometric transformability model and the segmentation;
- wherein the geometric transformability model of the segmentation of the patient image is described by the assigned transformability model data and describes a movability of at least one translational or rotational degree of freedom of the anatomical body part.

* * * * *